Feb. 17, 1970 J. L. WHEELER 3,496,287

SUPERVISORY SIGNALLING APPARATUS FOR GRAPHIC COMMUNICATION SYSTEMS

Filed Dec. 27, 1965 3 Sheets-Sheet 1

INVENTOR.
JOHN L. WHEELER

BY Anthony D. Cennamo

ATTORNEYS

INVENTOR.
JOHN L. WHEELER
BY Anthony D. Cennamo
ATTORNEYS

Feb. 17, 1970 J. L. WHEELER 3,496,287

SUPERVISORY SIGNALLING APPARATUS FOR GRAPHIC COMMUNICATION SYSTEMS

Filed Dec. 27, 1965 3 Sheets-Sheet 3

INVENTOR.
JOHN L. WHEELER
BY Anthony D. Cennamo
ATTORNEYS

United States Patent Office 3,496,287
Patented Feb. 17, 1970

3,496,287
SUPERVISORY SIGNALLING APPARATUS FOR GRAPHIC COMMUNICATION SYSTEMS

John L. Wheeler, West Webster, N.Y., assignor to Xerox Corporation, Rochester, N.Y., a corporation of New York Filed Dec. 27, 1965, Ser. No. 516,294
Int. Cl. H04n 7/02
U.S. Cl. 178—5.6 11 Claims

ABSTRACT OF THE DISCLOSURE

A graphic communication system for multiplexing forward and reverse control signals into a single wideband channel. In accordance with the invention, the flyback or clamp time of the facsimile scanner is sub-divided into a plurality of discrete signaling times. Forward and reverse supervisory signals including a combined sync interlaced pattern are generated by logical gating means and subsequently multiplexed into the video channels during the fly-back time.

This invention relates to digital transmission systems and more particularly to methods and apparatus for combining forward and reverse control signals with information signals into a single wideband channel.

In many communication systems, information is transmitted in a particular form or pattern and such information is useful only if it is related to some time value or scale which is common to both the transmitter and receiver. A common example is television wherein the received video signals are complete unintelligible unless the receiver scanning means is locked in, i.e., in phase and frequency synchronism with the transmitter scanner. Similar problems exist in multiplexed telemetry systems, facsimile systems and similar digital graphic communication systems. In such systems, information is commonly transmitted in a repetitive series of uniform time intervals. The majority of each time interval is utilized for the transmission of graphic or other information data with a minor portion of each interval being utilized for the transmission of a synchronizing signal of a predetermined form.

While the present invention is equally applicable to all graphic and general information communication systems, it will be described in conjunction with a digital facsimile system. It is conventional in facsimile systems to employ a transmitter including an image exploring device which scans an original document along some predetermined raster or pattern of sequential lines and thereby derives video signals which correspond to the optical density of the original document. These video signals are then transmitted to a remote receiver which includes a marking means which scans a record medium in synchronism with the transmitter scanner along a similar raster and in response to received video signals marks the record medium, thus recreating the original document. In this type of facsimile system the resolution and fidelity of the image produced at the receiver depends upon the characteristics of the transmitter and receiver as well as the phase, frequency distortion and noise characteristics of the communication link which interconnects the transmitter and receiver.

As is known in the art, it is customary to initially transmit a series or pattern of synchronizing signals prior to the transmission of the video signals thereby attempting to insure that the receiver is synchronized with the transmitter. Further, it is known in the art for the receiver to generate and transmit an appropriate signal to the transmitter indicating that the receiver is in synchronism with the transmitter. It is also known to transmit other control signals such as paper cut signals as well as other supervisory signals to tell the receiver, for example, where to cut the recreated copy of a document being transmitted. While it is desirable for the transmitter to know that the receiver is ready, i.e., is in synchronism, in order to avoid lost or wasted transmission time when the transmitted video signals would be unintelligible due to the loss of synchronism, it is often a costly luxury which the normal low cost or medium cost systems cannot afford.

The transmission link is usually, by far, the most expensive element in a graphic communication system and the one which principally limits the speed and/or quality of transmission. As is known, prior art attempts to obtain forward and reverse supervisory control signalling has generally involved the use of a separate supervisory channel or a transmission link of sufficiently broadband capacity to permit a separate supervisory channel. Because the transmission link is a very expensive element in any graphic communication system, neither of the above mentioned methods of obtaining reverse supervisory control have been entirely satisfactory. Even where a narrow band supervisory channel is employed, it still represents a potentially costly item in any graphic communication system.

It is therefore an object of the present invention to provide methods and apparatus for economically achieving forward and reverse supervisory control signalling in graphic communication systems.

It is another object of the present invention to reduce the operating costs of digital, line-by-line graphic communication transmission systems.

It is another object of the present invention to simplify forward and reverse supervisory signalling in digital graphic communication systems.

It is yet another object of the present invention to provide methods and apparatus for economically multiplexing forward and reverse supervisory signals during predetermined periodic portions of transmission times in a graphic communication system.

It is a still further object of the present invention to provide methods and apparatus for cyclically transmitting a plurality of predetermined patterns of identifiable forward supervisory control signals to uniquely signal the beginning of each scan in a facsimile system.

Various methods and apparatus for accomplishing the above listed objects and other desirable aspects of the present invention will become apparent from the following detailed description taken in conjunction with the accompanying drawings in which.

Figures 2A, 2B, 3A, 3B, 3C, 3D, 4A, 4B:
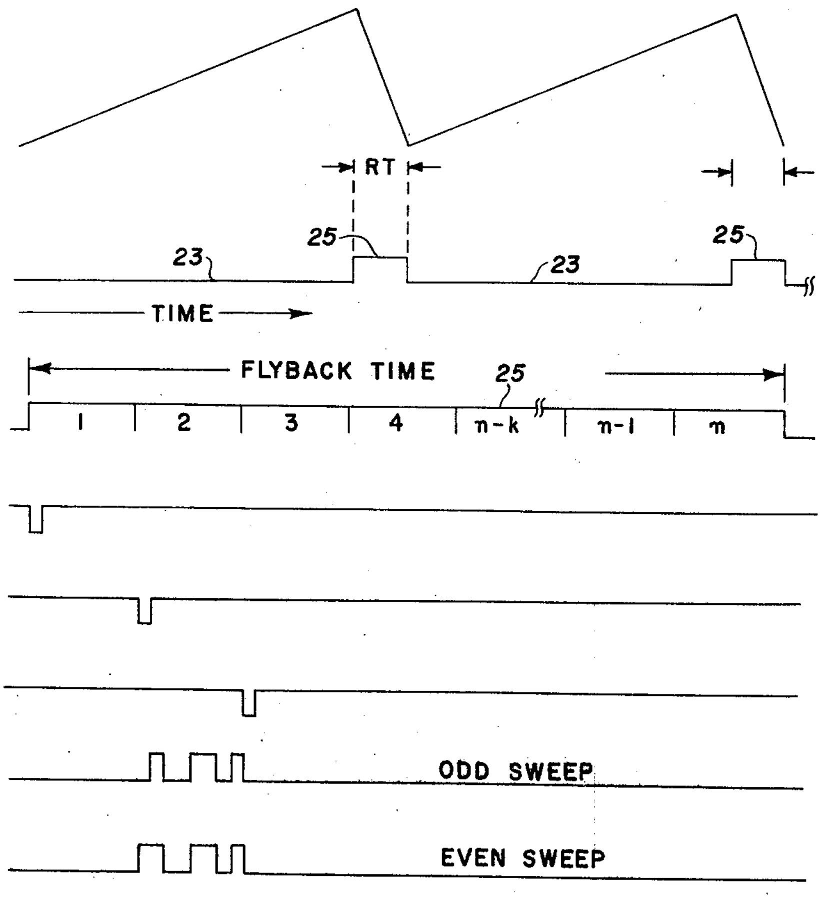
FIGS. 2A and 2B are waveforms illustrating the typical prior art deflection waveforms associated with a CRT flying spot scanner.
Figure 5:
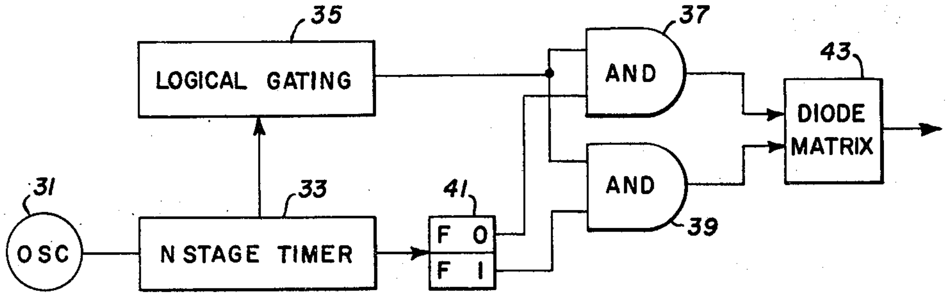
Figure 6:
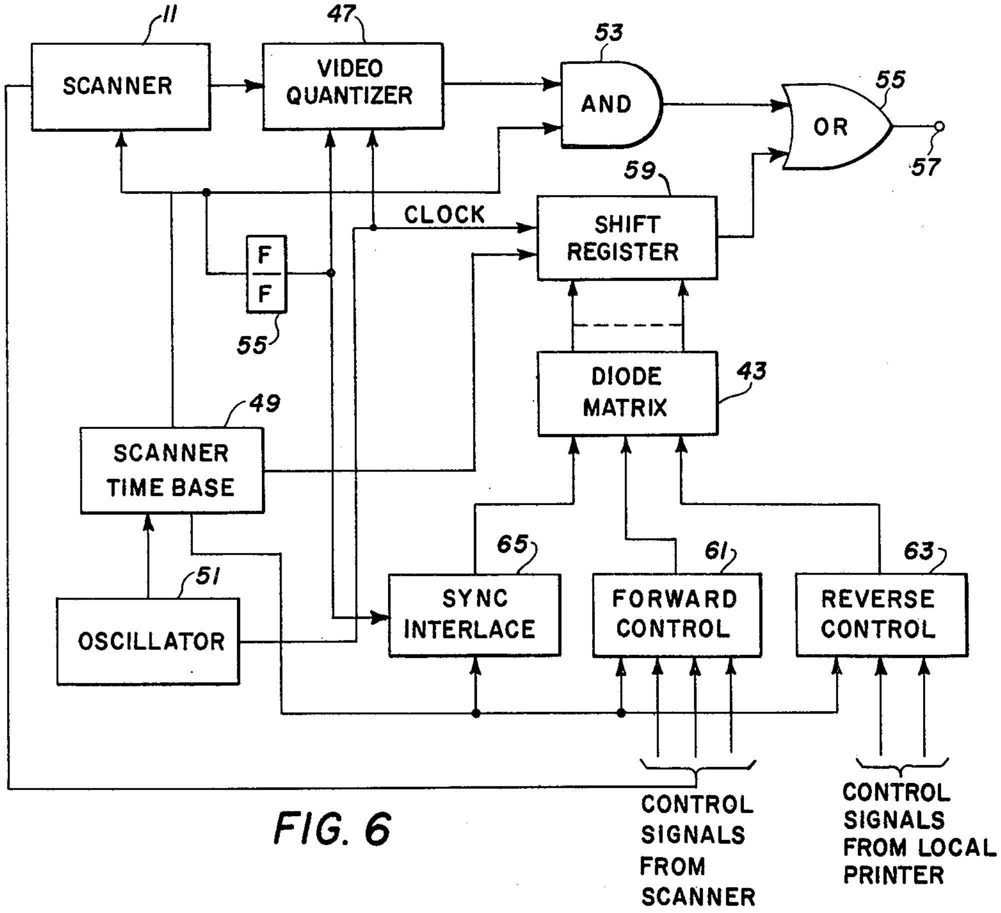
Figure 7:
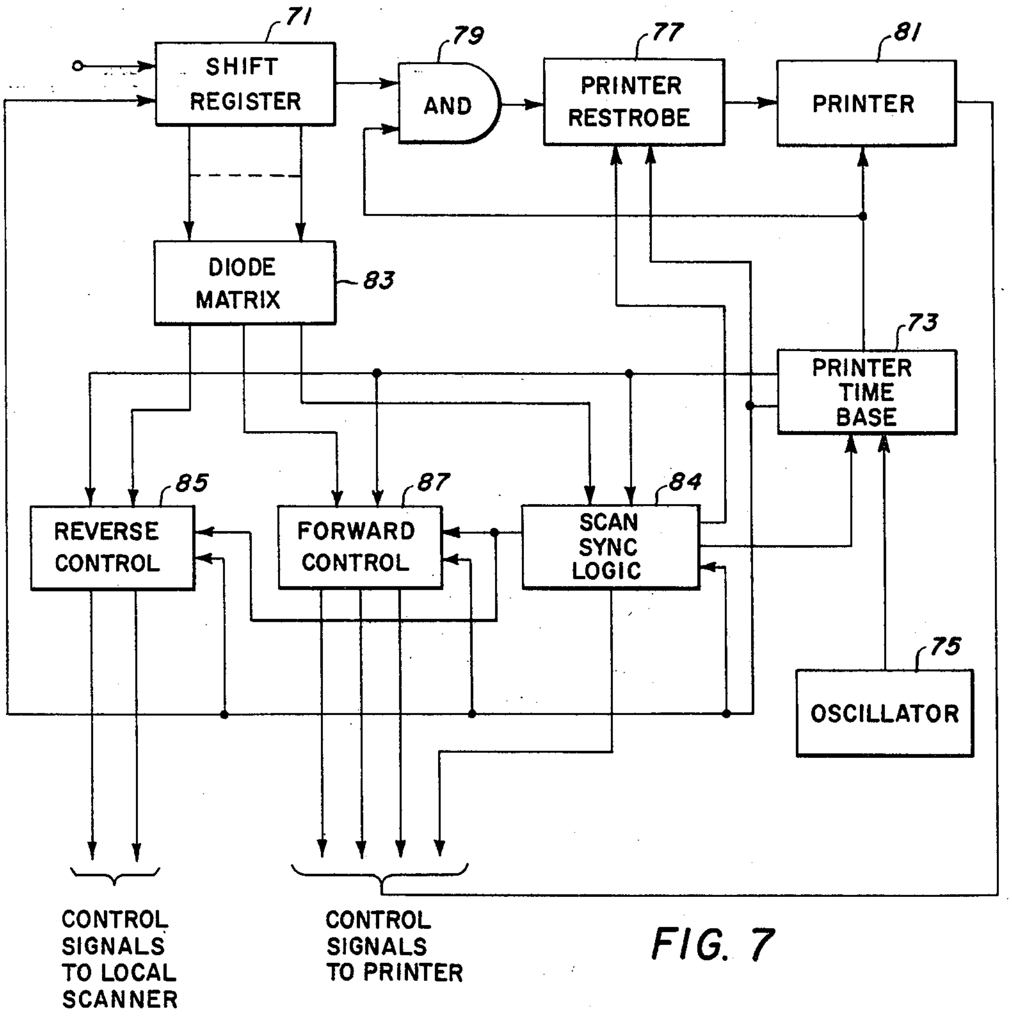

FIGS. 3A through D illustrate idealized voltage-time waveforms indicating the multiplex facilitating subdivision of the flyback time interval in accordance with one aspect of the present invention;

FIGS. 4A and 4B illustrate synchronizing and sweep identifying interlace code patterns in accordance with another aspect of applicant's invention;

FIG. 5 is a block diagram of a sync-interlace generating circuit in accordance with another aspect of the present invention;

FIG. 6 is a block diagram of a scanner digital converter in accordance with the present invention; and FIG. 7 is a block diagram of a printer digital converter in accordance with the present invention.

Figure 1:
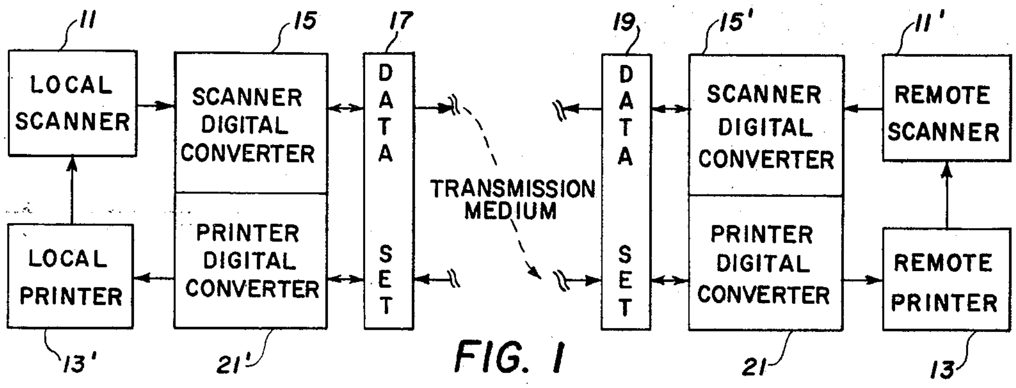
FIG. 1 is a block diagram of a full-duplex facsimile system embodying the principles of applicant's invention.

Referring now to FIG. 1, there is shown a full-duplex facsimile system embodying the principles of applicant's invention. As is known, in the normal facsimile system a document inserted into a local scanner 11 is reproduced at remote facsimile printer 13 by signals generated at the scanner which are transmitted and control the operation of the remote printer. In the full-duplex system, information may be transmitted simultaneously in both directions thus permitting a document inserted into the local scanner to be reproduced by the remote printer while a document inserted in a remote scanner is being reproduced by the local printer.

Since the operation of the local and remote scanners and local and remote printers are identical, for simplicity only one pair i.e., one facsimile network, will be explained. While a document is being scanned, light from an image exploring device is reflected from the document and falls upon a pickup device, for example, a photomultiplier tube, which converts the varying intensity light signals into electrical signals. These varying intensity electrical signals may be transmitted as amplitude modulated signals or may be first converted into discrete voltage levels i.e., digitalized with one level representing the black and the other representing white. While it is preferable that the present invention be practiced with a digitalized system, it is not necessarily restricted thereto. The resulting random transition video signals and separate control signals, hereinafter to be further explained, are transferred to the scanner digital converter 15.

The video signals thus coupled to the input of the scanner digital converter 15 are converted from a non-synchronous video stream into a synchronous video stream. Control characters are encoded or generated from incoming control signals from the scanner and are time divisional multiplexed into the video stream for transmission. Generally speaking, these control characters are gated into the video signal during the flyback, clamp or retrace time of the image exploring device. The multiplexed video and control signals are then applied to one input of the transmitter data set 17 which, generally speaking, converts signals into a form adaptable for transmission over a transmission medium which might comprise a microwave link, a broadband cable or the like. At the receiving terminal, the multiplexed signals are applied from the receiver data set 19 to a printer digital converter 21 which demultiplexes the video and control signals and develops therefrom appropriate control and activating signals for controlling the remote printer.

One such image exploring device which is particularly applicable to such facsimile systems is the flying spot scanner. The flying spot scanner generally comprises a cathode ray tube and associated deflection circuitry for periodically sweeping an electron beam on a phosphorus screen thereby generating a point source of light. In the flying spot scanner, the light at the scanner is projected through appropriate lenticular means onto the document from whence it is reflected onto the pickup circuitry. Similarly, while many types of facsimile printers are known, one such printer involves the use of a CRT flying spot scanner in conjunction with a rotatably supported selenium type xerographic drum. In such a system, the discrete voltage levels generated at the local scanner represent video information and actuate or control the cathode ray tube light beam at the remote printer turning it off and on for black and white, respectively.

FIG. 2A illustrates a ramp shaped waveform similar to that conventionally applied to the deflection apparatus of a cathode ray tube. As is known during the linearly rising portion of the waveform, the beam is swept across the face of the phosphorus screen at a constant rate. During the retrace time, RT, the beam is blanked and repositioned at the starting point thereby reading it for another sweep. FIG. 2B shows a timing diagram corresponding to the ramp shaped waveform in which video information would be generated during the portion 23 and the beam would be blanked during the retrace portion 25.

As shown in FIG. 3, the flyback or retrace time is subdivided, in accordance with one aspect of the present invention, into a plurality of discrete timing slots #1, #2 . . . *n*–1, *n*. By subdividing the flyback or retrace time into a plurality of discrete signalling times, a plurality of forward and reverse signals may be conveniently multiplexed into the transmission stream during the otherwise unused portions of the retrace time. As shown, the retrace or flyback time may be divided into N subintervals and while equal spacing is shown, any convenient subdivision may be employed. As will hereinafter be more fully explained, the discrete signalling times comprising submultiples of the flyback time may be employed for reverse as well as forward control signalling. As shown in FIGS. 3B, C, and D, a single signal may be generated by the clock generator in the appropriate time slot to actuate or signal the desired command in a manner hereinafter to be more fully decsribed.

In a copending application entitled "Staggered Scan Facsimile," Ser. No. 423,061, filed Jan. 4, 1965, there is disclosed the advisability of staggering or offsetting adjacent line-by-line scans in a digital facsimile apparatus along with methods and apparatus for accomplishing the same. As disclosed in this copending application, which is assigned to the assignee of the present invention, the respective scans may be denominated odd and even and a separate phase of a timing pulse stream may be employed to time quantize the non-synchronous video stream.

As taught in the hereinabove mentioned copending application, to properly decode the staggered scan facsimile data stream it is necessary that the receiver utilize the appropriate phase of clock to reconstitute the respective offset or staggered scans. FIG. 4 illustrates, in accordance with one aspect of the present invention, a coded or combined sync-interlace word including an interlace bit for adequately characterizing the initiation of each sweep and for identifying it as an odd or even numbered sweep. As shown in FIG. 4A, the odd sweep may comprise a binary word which includes a 01001101 pattern configuration in which the down is considered a zero and the up is considered a one. Similarly, FIG. 4B shows a combined sync-interlace signal which may identify an even sweep in that it has one bit differed from the odd sweep, namely, the initial bit. The even sweep sync-interlace word may comprise, as shown, a 11001101 pattern. In the illustration shown in FIGS. 4A and 4B, the initial bit has been denominated as the interlace bit, in which it is a zero for an odd sweep and a one for even sweep. However, while the initial bit is shown as the interlace bit, any bit in the sync pattern might equally well be so employed. For example, the interlace bit might be the last bit in a particular pattern.

As illustrated, the combined sync and interlace pattern is shown in the second time slot of the subdivided flyback time interval. The position of the combined sync and interlace pattern might be transmitted i.e., multiplexed, in any one of the slots shown and is merely illustratively shown as appearing in a second time slot. Apparatus for generating the combined sync interlace patterns will be disclosed hereinafter in conjunction with other figures. Similarly, a description of other forward and reverse control signals and apparatus for generating the same, which may be generated and transmitted in any of the subdivision time slots of the flyback time as illustrated in FIG. 3A, will be hereinafter given.

Referring now to FIG. 5, there is shown a block diagram of logical gating apparatus for alternately generating an odd-even sync-interlace pattern. As shown, the basic timing oscillator 31 generates a pulse train which is coupled to the input of an *n*-stage timer 33. The timer may comprise a plurality of cascaded bistable elements arranged in a counter configuration. In response to the signals emanating from the oscillator 31, the counter 33 sequentially registers a count in a predetermined ordered sequence. Logical gating means 35, which may comprise a plurality of logical AND gates, is selectively coupled to predetermined stages of the counter and is arranged to select timing intervals, for example, a particular portion or slot of the flyback time of a sweep. In response to this selection of a predetermined interval, for example, as shown in FIGS. 3A and 4A and B the second time slot of the flyback interval, and logical gating selectively actuates one input of AND gates 37 and 39 which may be selectively denominated the odd and even gates respectively. An odd-even flip-flop 41 is arranged as a center driven or toggle flip-flop which in response to predetermined signals, i.e., the blanking pulse, emanating from timer counter 33 assumes one or the other stable states depending upon the counter and the initial or reset condition of the flip-flop. The outputs of the odd-even flip-flop 41 are respectively coupled as one input to the odd-even AND gates 37 and 39. In response to the simultaneous actuation of the inputs to one or the other odd-even AND gate pair, an output signal is derived which is coupled to an input line of a diode matrix 43. The diode matrix in response to the input of one or the other signals emanating from the output of either the odd or even flip-flop generates a pattern similar to that shown and described hereinabove in conjunction with FIG. 4A or B. In a manner hereinafter to be more fully described, such a combined sync and interlace pattern is multiplexed into the video stream during a portion of the flyback or retrace interval and is thus transmitted to the remote printer digital converter thereby enabling the positive identification of an individual sweep as an odd or even sweep.

Referring now to FIG. 6, there is shown a block diagram of a scanner digital converter embodying the principles of the present invention. A facsimile scanner 11 may be of any type conventionally employed in the art which converts information on an original document or the like into video waveforms corresponding to successive lines of the document. The video signals are then applied, for example, to a squaring circuit which converts the video signals into a two-level or digitalized type of signal train. The two-level signals from the scanner are then applied to a video quantizer 47 wherein the two level, non-synchronous video signals are converted to a time quantized or synchronized signal train in which all transitions are restricted to a predetermined set of times. In the illustrated embodiment, the predetermined times are those defined by master clock times derived from a scanner time base generator 49 which is driven by a master clock oscillator 51. In certain environments the clock signals may be supplied by equipment associated with the transmission link rather than by the facsimile transmitter itself. Illustratively, the clock signals may vary in frequency from about 250 kilocycles for use with a broadband commercial transmission service, known as "Telpak C," to about 2500 cycles for use with ordinary telephone circuits.

Scanner time base generator 49 generates the basic timing pattern for controlling the logical gating apparatus of the scanner digital converter in accordance with a predetermined time sequence. The basic time generator 49 may comprise a plurality of cascaded bistable elements arranged in a counter configuration in conjunction with appropriate logical gating for selecting predetermined time intervals in accordance with the contents of the counter. Thus, the signals emanating from the master oscillator 51 are applied to the time base generator 49 which generates various timing signals at suitable submultiples of the clock frequency for controlling the various functions of the facsimile transmitter.

As hereinabove mentioned, one of these timing signals is a video gate or blanking signal which is applied to the scanner 11 to control the scanning frequency and timing. This blanking signal is also applied as one input to a video AND gate 53 to selectively gate the video signals during the non-blanking portion of the sweep trace. This timing signal is also applied to an odd-even flip-flop 55 which is arranged to divide the blanking pulse frequency in half, thus providing a two-level output signal which has different values for odd and even number sweeps of scanner 11. The output of flip-flop 55 is applied to the video quantizer 47 and also to sync-interlace circuit 65. The output of AND gate 53 is coupled as one input to OR gate 55 which has its output terminal coupled to a transmitting terminal 57 where the video stream and the multiplexed supervisory signals, hereinafter to be more fully described, are suitably coded, modulated or the like before being transmitted over a communication link. The transmitter terminal and coding apparatus are generally part of the transmission link which is furnished by the communication companies and forms no part of the present invention.

The scanner digital converter also includes a shift register 59 which has its output coupled as one input to OR gate 55 for multiplexing control signals into the video stream during the blanking or retrace periods. The shift register may comprise any type well known in the art, for example, a plurality of cascaded bistable elements wherein the number depends upon the word length of the respective supervisory words.

The inputs of the various register stages of shift register 59 are connected via a diode matrix 43 to a plurality of supervisory control signalling word or pattern generators denominated: the forward control generator 61, the reverse control generator 63, and the sync-interlace control generator 65. These various control word generators load a predetermined digital word into shift register 59 by selectively actuating the diode matrix 43 at a time determined by the individual timing pulses or slots applied to the various control circuits by the scanner time base 49. For example, these time slots may comprise the various pulses shown in FIGS. 3B, C, and D as occurring at the beginning of the first three subdivision time slots of the flyback time respectively. Thus, a particular control word would be loaded into the shift register 59 upon the command from the time base generator 49 by the diode matrix 43 and subsequently serially shifted out of the register through the OR gate 55 during the flyback or retrace time. As hereinabove stated, the output of shift register 59 represents the plurality of separate supervisory control words in predetermined time slots. With the interlace timing pulses generated by scanner time base 49, the shift register 59 is unloaded while AND gate 53 is held off by the blanking pulse and thus signals appearing at the output of OR gate 55 comprise a synchronous facsimile signal train multiplexed with supervisory control signals.

One embodiment of the sync-interlace pattern generator was described in conjunction with FIG. 5. Similarly, the forward control generator 61 and the reverse control generator 65 may respectively comprise an array of logical gating which is responsive to control signals generated in the scanner. For example, it might be desirable to transmit to a remote printer signals indicating that a document has been inserted into the scanner; signals indicating that a document is about to be transmitted and signals indicating the length of the particular document to be transmitted. Similarly, it might be advantageous especially in a net-type communication system, wherein a plurality of full-duplex installations may be connected by automatic switching means to any one of a plurality of stations in the net, to include automatic switching signals for selectively actuating the switching apparatus to select the appropriate subscriber. The input to the respective control generators may comprise DC level signals which selectively actuate appropriate logical gating means to enable the unique generation of supervisory code words by the diode matrix in response to a predetermined timing pulse applied from the scanner time base generator 49.

In the full-duplex network it is further desirable for the local printer to be able to communicate with the remote scanner. For example, when the remote scanner is initially actuated, a synchronizing pulse pattern would be sent from the remote scanner 11' to the local printer 13', as shown in FIG. 1. In response to the initial synchronizing burst, the printer time base generator at the printer digital converter 21' would be synchronized with the time base generator of scanner digital converter 15'. In such an instance when the local printer is ready, i.e., in synchronism, it is desirable to send the appropriate signal to the remote scanner 11'. In response to the "in-sync" condition, the appropriately labeled inputs to reverse control generator 63, as shown in FIG. 6, would be actuated and during the next appropriate time interval for multiplexing control signals, the diode matrix would be actuated by the reverse control generator 63 thereby loading shift register 59 with the appropriate reverse supervisory control word. This control word would then be serially read out through OR gate 55 and transmitted to the remote printer digital converter 21 from which it would be demultiplexed and applied to the scanner digital converter 15' indicating printer 13 is ready.

Referring now to FIG. 7, there is shown a block diagram of a printer digital converter which is compatible with the scanner digital converter shown in FIG. 6. Functionally speaking, the printer digital converter performs several distinct operations; namely, it receives the multiplexed video and control data stream, and recovers or demultiplexes and separates the sync and other control information from the time video signals of the multiplexed data stream. After demultiplexing, the printer digital converter generates a sweep gate in synchronism with the incoming data stream for controlling the facsimile printer and generates standard signals for actuating the facsimile printer in accordance with received video signals.

As shown, the combined video and control signals are applied in a serial manner from the output terminal of a data set 19, as shown in FIG. 1, to the input of a shift register 71. The received signals are stepped through the shift register 71 by the application thereto of clock signals from the printer time base generator 73. The printer time base generator 73 generates a pattern of basic timing pulses, in a manner similar to that hereinabove described in conjunction with the scanner digital converter, in response to signals from a basic oscillator 75. At the printer digital converter, the output of the printer time base 73 is synchronized in a manner hereinafter to be more fully described, by having a counter selectively retimed by received synchronizing signals.

The video signals emerging from the shift register 71 are applied to a resynchronizing or restrobe circuit 77 by an AND gate 79 which has the other input thereto coupled to a blanking signal generated by the printer time base generator 73. In the printer resynchronizing or restrobe circuit 79, the video signals are retimed by an appropriately derived odd-even signal from sync-interlace regenerator 89 which uniquely characterizes each scan thereby facilitating the retiming of the received signals for an application to printer 81. Printer 81 may be of any type well known in the art, for example, the hereinabove mentioned rotatably supported selenium xerographic type drum in conjunction with a flying spot scanner. In such an arrangement, the restrobed signals selectively actuate or turn on the CRT beam for each black space and leave it off for each white space, respectively.

The outputs of the various bistable elements comprising shift register 71 are appropriately coupled to input lines of a diode decoding matrix 83. The output lines of the diode decoding matrix 83 are coupled to a plurality of supervisory word regenerating circuits denominated: the reverse control regenerating circuit 85, the forward control regenerating circuit 87, and the sync-interlace regenerating circuit 84. Thus, in a manner analogous to the hereinabove described generation of supervisory words, the formerly encoded and multiplexed supervisory control words are decoded thereby generating a unique output from matrix 83 at the appropriate time, as determined by the timing pulses from printer time base 73, which would correspond to those multiplexing control times hereinabove described in conjunction with FIGS. 3 and 4.

In operation, the multiplexed video and control signals which are received by the printer digital converter are demultiplexed and applied in the proper phase and time relationship for controlling the printer. Likewise, the forward and reverse signalling controls are recovered and regenerated for signalling the appropriate supervisory control function. For a further explanation of various aspects of a system incorporating the present invention, reference may be had to the above identified copending application Ser. No. 423,061 which is herewith incorporated herein by reference.

By the foregoing there is disclosed methods and apparatus for generating, multiplexing, and demultiplexing a plurality of forward and reverse supervisory control signals during otherwise unused portions of document transmission times in a facsimile or graphic communication system. The foregoing is to be understood to be illustrative only and is not intended to be in any way limiting.

While the converter apparatus has been shown as separate apparatus in the transmission system, the various supervisory signalling functions could equally well be incorporated in a facsimile transceiver or the respective scanner and printer apparatus. Similarly, which the various subdivisions of successive flyback or clamp times have been shown and illustrative as having similar supervisory signalling subdivisions, a cyclic coding or signalling scheme could be utilized whereby predetermined supervisory signalling slots could be assigned or denominated for signalling various signalling functions in a cyclic or periodic manner including more than one flyback or clamp time. That is, a predetermined number of retrace or flyback times or subdivisions thereof could be utilized in a cyclic manner for accomplishing various supervisory signalling functions.

As would be evident to those skilled in the art, many logical gating schemes could be employed to accomplish the generation, multiplexing and demultiplexing of the supervisory signals during the subdivided flyback or retrace time interval without departing from the scope of applicant's invention. It is therefore applicant's intention to be limited only as indicated by the scope of the following claims.

What is claimed is:

1. In a facsimile system including a transmitter station having scanning means for converting information on a document to be transmitted into a series of video signal trains corresponding to at least successive portions of lines of information along a predetermined scanning raster, means for coupling the video signal trains in sequence of generation to a communication link, and additionally including a receiver station having means for receiving the video signal trains and recording means responsive to said video signals for marking a record along a similar scanning raster thereby recreating the original document, the improvement comprising:

first and second multiplexing means at said transmitter and receiver, respectively, for generating and transmitting a plurality of forward and reverse supervisory signals during discrete subdivisions of at least a portion of the transmission time intermediate adjacent ones of said video signal trains.

2. The improvement defined in claim 1 wherein said first multiplexing means at said transmitter includes logical gating means for generating a plurality of discrete combined scan line identifying and supervisory synchronizing binary words in a predetermined sequence.

3. In a data communication system the method of transmitting a plurality of forward and reverse supervisory control signals intermediate successive information signal trains comprising the steps of:

dividing a total transmitting period into a number of similar subgroup line scan timing intervals;

subdividing each of said subgroup timing intervals into a plurality of discrete supervisory signalling times and an information period;

generating at least one of a plurality of discrete binary words representing one of a group of predetermined forward and reverse supervisory control signals during at least a portion of said information period; and multiplexing selected ones of said forward and reverse supervisory control signals in a predetermined sequence during selected ones of said supervisory signalling times.

4. A full-duplex graphic transmission system comprising:

first and second facsimile terminal means, each terminal means including:

scanning means for scanning an original document to be transmitted and generating video signals corresponding to the information on said document along a predetermined scanning raster, and printing means responsive to received video signals for actuating marking apparatus in response to said received video signals for recreating the original document on a record member;

means for generating a plurality of discrete timing pattern wave trains for controlling the operation of each of said facsimile terminal means;

means responsive to a first predetermined one of said timing pattern wave trains for time quantizing said video waveforms;

means for subdividing at least a second predetermined one of said timing pattern waveforms into a video portion and to a video blanking portion;

means for subdividing said video blanking portion into a plurality of discrete supervisory signalling times;

AND gate means responsive to said video signals and to said video portion of said second predetermined timing pattern waveform for selectively coupling video signals to a transmitting terminal;

supervisory signal generating means responsive to one of said timing pattern wave trains and to signals from said facsimile terminals for generating a plurality of supervisory signals; and multiplexing means responsive to said supervisory control signalling means and said AND gate means for selectively transmitting said video signals during said video portions of said second timing pattern waveforms and for transmiting said supervisory signals during predetermined ones of said discrete supervisory signalling times.

5. The graphic transmission system defined in claim 4 wherein said supervisory signal generating means comprises:

a storage register;

means for coupling the serial output of said register to said multiplexing means;

matrix means having its respective output lines coupled to predetermined ones of the inputs of said register for selectively loading binary words therein; and a plurality of logical gating means, each logical gating means being responsive to a predetermined one of said timing waveforms and a predetermined one of said input signals from said facsimile terminal means for selectively actuating said matrix means.

6. The system defined in claim 5 wherein said register means comprises $n$ bistable elements arranged in a counter configuration, wherein $n$ is an integer greater than two and wherein said matrix means loads said binary words into said register in parallel.

7. In a facsimile system including a transmitter for transmitting a plurality of video signals representative of information on an original document and a receiver for receiving said signals and generating a facsimile of said document, a supervisory control system comprising:

first multiplexing means at said transmitter for generating and transmitting a plurality of forward supervisory signals during discrete subdivisions of at least a portion of the transmission time intermediate adjacent ones of said plurality of video signals, and second multiplexing means at said receiver for generating and transmitting a plurality of reverse supervisory signals during said discrete subdivisions of at least said portion of the transmission time intermediate adjacent ones of said plurality of video signals.

8. The supervisory control system as set forth in claim 7, wherein said first multiplexing means includes means for transmitting said forward supervisory signals from said transmitter to said receiver, and wherein said second multiplexing means includes second means for transmitting said reverse supervisory signals from said receiver to said transmitter.

9. The supervisory control system as set forth in claim 8 including means at said receiver for demultiplexing said forward supervisory signals to initiate the synchronous operation of said receiver with said transmitter; and means at said transmitter for demultiplexing said reverse supervisory signals to indicate to said transmitter that said receiver is in condition to receive said video signals.

10. In a facsimile system including a transmitter for transmitting a plurality of video signals representative of information on an original document and a receiver for receiving said signals and generating a facisimile copy of said document, a supervisory control system comprising:

multiplexing means at said transmitter for generating and transmtiting a plurality of forward supervisory signals to said receiver during discrete subdivisions of at least a portion of the transmission time intermediate adjacent ones of said plurality of video signals, and demultiplexing means at said transmitter for demultiplexing a plurality of reverse supervisory signals from said receiver during said discrete subdivisions of at least said portion of the transmission time intermediate adjacent ones of said plurality of video signals, said reverse supervisory signals indicating that said receiver is ready to receive said video signals from said transmitter.

11. A facsimile system including a transmitter for transmitting a plurality of video signals representative of information on an original document and a receiver for receiving said signals and generating a facsimile of said document, a supervisory control system comprising:

demultiplexing means at said receiver for demultiplexing a plurality of forward supervisory signals transmitted from said transmitter during discrete subdivisions of at least a portion of the transmission time intermediate adjacent ones of said plurality of video signals from said transmitter, and multiplexing means at said receiver for generating and transmitting a plurality of reverse supervisory signals to said transmitter during said discrete subdivisions of at least said portion of the transmission time intermediate adjacent ones of said plurality of video signals, said reverse supervisory signals indicating to said transmitter that said receiver is ready to receive said video signals.

References Cited

UNITED STATES PATENTS

| | | | |
|---|---|---|---|
| 2,843,660 | 7/1958 | Franklin et al. | 179—4 X |
| 3,084,213 | 4/1963 | Lemelson | 179—4 X |
| 3,336,445 | 8/1967 | Nakagawa | 179—89 |
| 2,543,015 | 2/1951 | Grieg | 178—5.8 |
| 3,046,331 | 7/1962 | Gebel | 178—5.6 X |
| 3,201,512 | 8/1965 | Mason et al. | 178—6 |

JOHN W. CALDWELL, Primary Examiner

R. K. ECKERT, Jr., Assistant Examiner

U.S. Cl. X.R.

178—6